(12) United States Patent
Funayama et al.

(10) Patent No.: US 6,655,154 B2
(45) Date of Patent: Dec. 2, 2003

(54) OPERATION METHOD AND OPERATION APPARATUS FOR MULTI-SYSTEM REFRIGERATORS, AND REFRIGERATING APPARATUS

(75) Inventors: Shin Funayama, Tokorozawa (JP); Hidekazu Tanaka, Tokorozawa (JP); Hisashi Yamamoto, Fujiyoshida (JP); Kazutoshi Aoki, Kawaguchiko-machi (JP)

(73) Assignees: Sumitomo Heavy Industries, LTD, Tokyo (JP); Anelva Corporation, Tokyo (JP)

( * ) Notice: Subject to any disclaimer, the term of this patent is extended or adjusted under 35 U.S.C. 154(b) by 0 days.

(21) Appl. No.: 10/210,176

(22) Filed: Aug. 2, 2002

(65) Prior Publication Data

US 2003/0024252 A1 Feb. 6, 2003

(30) Foreign Application Priority Data

Aug. 3, 2001 (JP) ........................ 2001-236393

(51) Int. Cl.[7] ................................................. F25B 9/00
(52) U.S. Cl. ............................................. 62/6; 62/55.5
(58) Field of Search ........................... 62/6, 55.5, 157, 62/190, 193, 404, 419, 426

(56) References Cited

U.S. PATENT DOCUMENTS 3,656,540 A * 4/1972 Henrici .......................... 165/1
5,010,737 A * 4/1991 Okumura et al. ................. 62/6

FOREIGN PATENT DOCUMENTS

| JP | 03-015677 | 1/1991 |
| JP | 04-272486 | 9/1992 |

\* cited by examiner

Primary Examiner—Timothy L. Maust
Assistant Examiner—Malik N. Drake
(74) Attorney, Agent, or Firm—Arent Fox Kintner Plotkin & Kahn, PLLC

(57) ABSTRACT

An operation method and an operation apparatus for multi-system refrigerators, and a refrigerating apparatus. When gas compressed by a single compressor is supplied to a plurality of refrigerators through valves provided for the individual refrigerators, the opening/closing frequencies of the individual valves are slightly shifted to one another. As a result, with a simple constitution, the performances of the individual refrigerators are balanced without observing valve timings.

7 Claims, 5 Drawing Sheets

OPERATION METHOD AND OPERATION APPARATUS FOR MULTI-SYSTEM REFRIGERATORS, AND REFRIGERATING APPARATUS

BACKGROUND OF THE INVENTION

1. Field of the Invention

The present invention relates to an operation method and an operation apparatus for multi-system refrigerators, and a refrigerating apparatus. In particular, the present invention relates to an operation method and an operation apparatus for multi-system refrigerators for supplying multiple refrigerators with gas compressed by one or more compressors through valves provided for the individual refrigerators. The present invention also relates to a refrigerating apparatus using these operation method and apparatus.

2. Description of the Related Art

A Gifford-McMahon (GM) refrigerator and a pulse tube refrigerator are known as a refrigerator for using a phase difference between a pressure change and a volume change of an operating gas to generate a very low temperature. When refrigerators of this type are provided at multiple locations on a large apparatus such as sputtering apparatus for a semiconductor manufacturing apparatus, a single compressor 10 is shared by a plurality of refrigerators (three in this drawing) 31, 32, and 33 as shown in FIG. 1, instead of providing multiple compressors generating a high pressure and a low pressure for the individual refrigerators to reduce the cost and the energy consumption. In this case, valves 21, 22, and 23 (such as rotary valves) are provided for the individual refrigerators 31, 32, and 33 to supply the refrigerators 31, 32, and 33 with gas (such as helium gas) which is compressed by the single compressor 10, and is supplied alternately through a high pressure line 12 at a high pressure, and a low pressure line 14 at a low pressure.

The refrigerators 31, 32, and 33 conduct a refrigerating process, thereby repeating an adiabatic expansion for generating a low temperature state, resulting in refrigerating first refrigerating stages 31B, 32B, and 33B of cylinders 31A, 32A, and 33A to 30 to 100 K, and refrigerating second refrigerating stages 31C, 32C, and 33C to 4 to 20 K.

In the drawing, motors 41, 42, and 43 drive the valves 21, 22, and 23 to respectively rotate. A power supply line 50 for driving refrigerators provides the motors 41, 42, and 43 with the same drive signal.

However, when the single compressor 10 is used to drive multiple refrigerators 31, 32, and 33, a difference is generated in refrigerating performance of the individual refrigerators 31, 32, and 33 among one another. This is because the timings of the valves for supplying the helium gas in the individual refrigerators 31, 32, and 33 are fixed when the power supply is turned on. As a result, when intake timings overlap one another, more gas flows to the refrigerator which takes in gas first, thereby generating such a phenomenon as an imbalance in gas quantity flown to the individual refrigerators. Thus, when a valve opens in one refrigerator immediately after another valve opens in the other refrigerator, the helium gas is hardly supplied for this valve due to decrease of the supplied gas pressure, thereby presenting insufficient cooling performance. In addition, the helium gas flowing into a more cooled refrigerator is cooled further, thereby having a larger density. As a result, additional helium gas is supplied, thereby cooling this low-temperature refrigerator even further. On the other hand, since the helium gas hardly flows to a less cooled refrigerator, the refrigerator is not cooled sufficiently.

To solve this problem, Japanese Patent Laid-Open Publication Nos. Hei. 3(1991)-15677 and Hei. 4(1992)-272486 disclose such a control method as observing valve timing of the individual valves to feed back the valve timing, thereby controlling the timings for opening/closing are at an equal interval to one another.

However, since it is necessary to observe the valve timing by, for example, detecting currents supplied for the motors 41, 42, and 43 for driving the valves 21, 22, and 23, the complexity of the system increases, resulting in increasing the cost.

SUMMARY OF THE INVENTION

The present invention was devised to solve the conventional problem described above, and has an object of providing a simple constitution for solving the imbalance of the cooling performance among refrigerators without observing valve opening/closing timing.

An operation method for multi-system refrigerators of the present invention supplies a plurality of refrigerators with gas compressed by a single compressor through valves provided for the respective refrigerators. This method solves the problem above by shifting an opening/closing frequency of each of the valves slightly to one another.

In this method, a shift amount of the opening/closing frequencies of the valves may be changed depending on the number of the refrigerators. For example, the shift amount is decreased as the number of the refrigerators increases.

An operation apparatus for multi-system refrigerators of the present invention supplies a plurality of refrigerators with gas compressed by a single compressor through valves provided for the respective refrigerators. This operation apparatus solves the problem above by including inverters for slightly shifting an opening/closing frequency of each of the valves to one another.

The present invention also provides a refrigerating apparatus including the operation apparatus described above.

Further, in the present invention, the refrigerators described above may be used as cryopumps, thereby resolving an imbalance in performance among the cryopumps.

With the present invention, it is possible to prevent an overlap of the valve timing with a very simple and inexpensive constitution without means for observing the valve timing, thereby balancing the performance among refrigerators.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein.

DESCRIPTION OF THE PREFERRED EMBODIMENTS

Preferred embodiments of the present invention will be explained hereunder.

Figure 1:
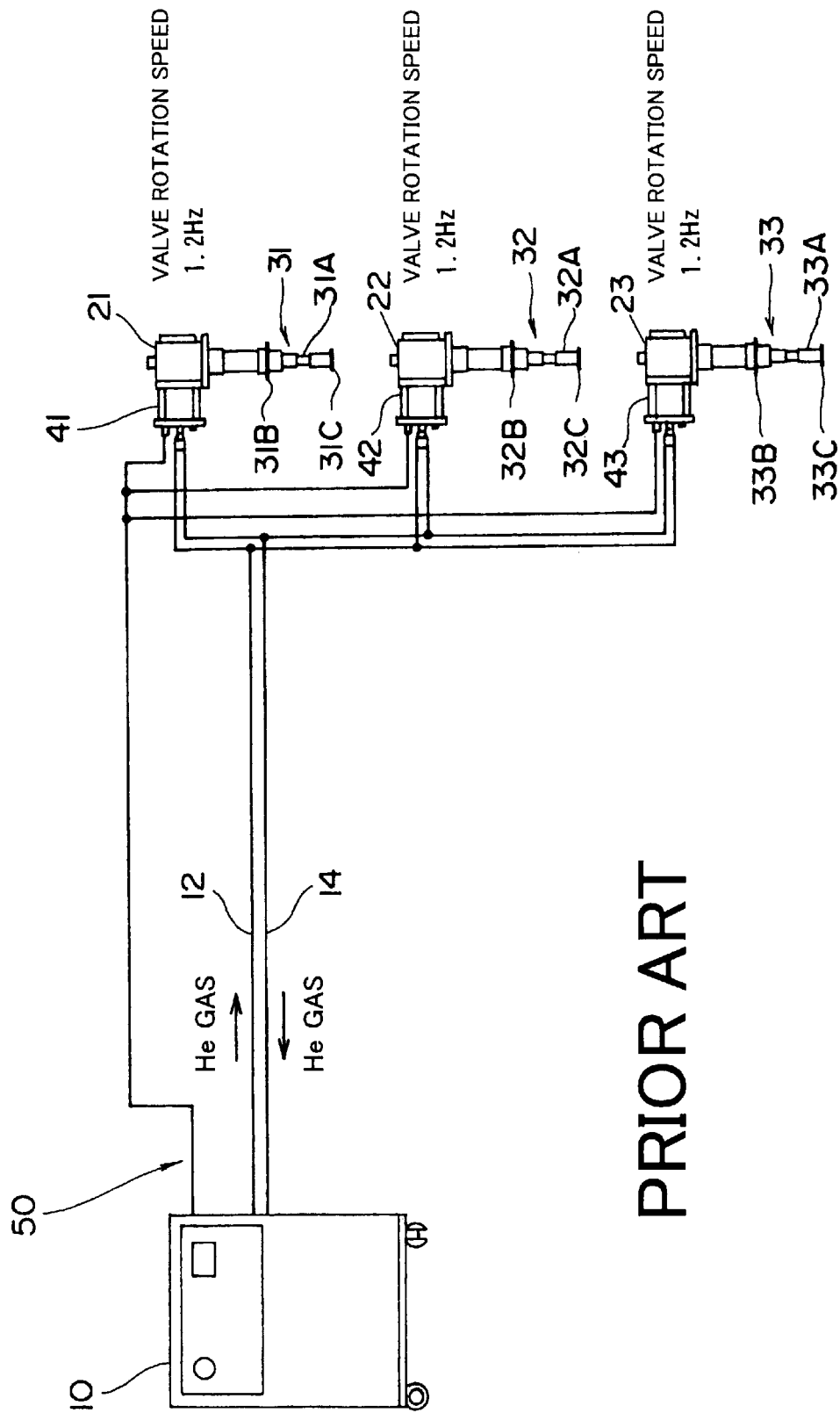
FIG. 1 is a piping diagram describing an example of an operation method for conventional refrigerators.
Figure 2:
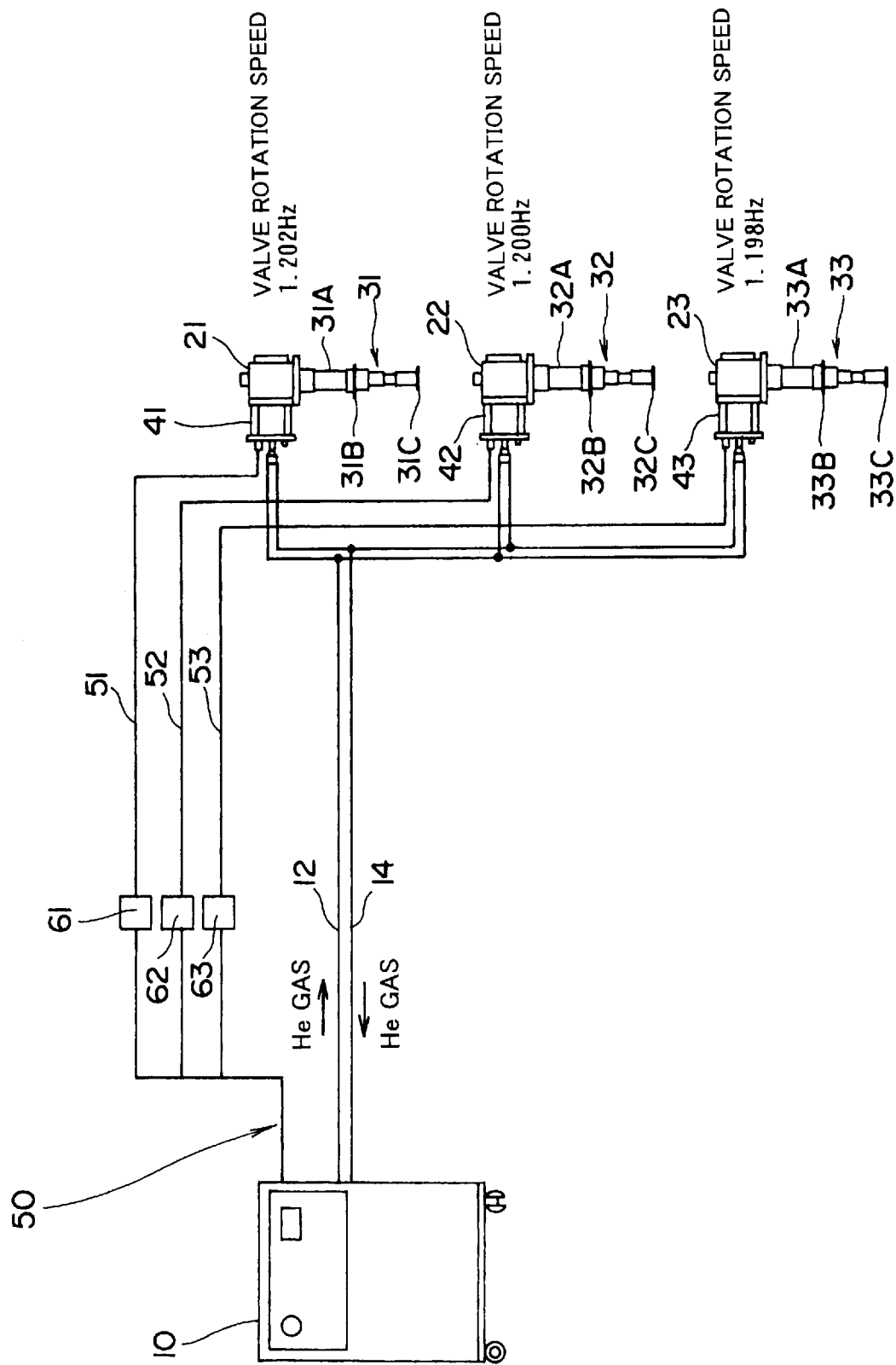
FIG. 2 is a piping diagram showing a first embodiment of the present invention.

In a first embodiment of the present invention, an operation apparatus for refrigerators supplies a plurality of refrigerators 31, 32, and 33 with gas compressed by a single compressor 10 through rotary valves 21, 22, and 23 provided for these individual refrigerators 31, 32, and 33 as in the conventional refrigerating apparatus. As shown in FIG. 2, there are provided inverters 61, 62, and 63 for slightly shifting the opening/closing frequency of each of the valves 21, 22, and 23 to one another in a power supply line 50 for driving refrigerators. This circulates shifted state in the valve timing of the valves of the individual refrigerators 31, 32, and 33 in a certain time period. In this drawing, power supply lines 51, 52, and 53 are provided for the individual refrigerators 31, 32, and 33.

When the valve opening/closing frequencies of the rotary valves 21, 22 and 23 determined by the valve rotation speeds are shifted by 0.002 Hz to a center frequency of 1.2 Hz which is a valve frequency for the normal operation, they are set to 1.202 Hz, 1.2 Hz, and 1.198 Hz respectively. This shift produces a difference of about one rotation in five minutes (0.002 Hz×2×60 sec.×5 min.=1.2 Hz).

When the sum of the shift amounts in the operation frequency for the entire refrigerators is excessively large, the performances of the individual refrigerators largely differ from one another. On the other hand, when the shift amounts of the operation frequencies for the individual refrigerators are excessively small, the refrigerating performances change as time elapses because of the heat capacities of the refrigerators, thereby generating a fluctuation. To avoid a remarkable difference in the performances of the refrigerators, a sum of the shift amounts should be limited to 0.04 Hz or less at the maximum, preferably to 0.02 Hz or less. To avoid the fluctuation in the refrigerating performance due to the heat capacities of the refrigerators, it is proper to set the period to 10 minutes or less according to experimental results. Thus, it is proper to set the mutual shift amounts among the individual refrigerators to 0.002 (a five-minute period) to 0.001 Hz (a ten-minute period).

With this setting, since the shifted state in the valve timing among the refrigerators circulates in a certain period, the imbalance in the gas flow quantity through the individual refrigerators occurs evenly, thereby balancing the refrigerating performances of the individual refrigerators. Although shifting the valve timing changes the refrigerating performance periodically, this change is absorbed by the heat capacity of the refrigerator. Consequently, as a whole, an effect which is macroscopically similar to a case where the valve timing is feedback-controlled is provided.

Figure 3:
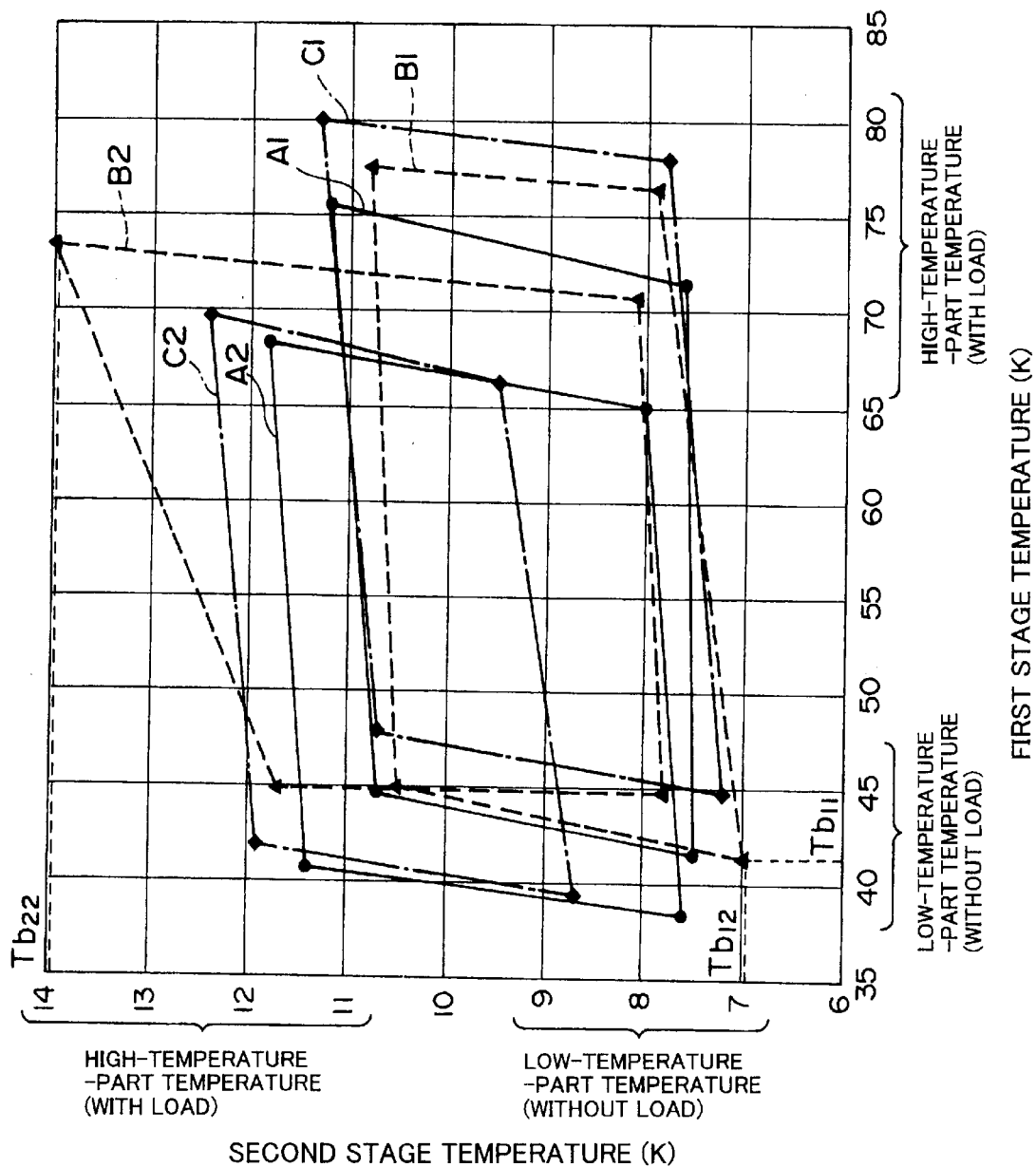
FIG. 3 is a chart of performance curves of refrigerators of the present invention in comparison with those of conventional refrigerators for describing effects of the present invention.

FIG. 3 shows performance curves of a conventional refrigerator and a refrigerator according to the present invention. In this chart, the horizontal axis represents a temperature of a first refrigerating stage 31B (referred to as a first stage temperature), and the vertical axis represents a temperature of a second refrigerating stage 31C (referred to as a second stage temperature). Curves A1 and A2 are performance curves obtained when refrigerators are operated while helium gas is supplied from corresponding dedicated compressors, namely when the refrigerators are independently operated. Thus, these curves A1 and A2 show original performances of the refrigerators. Curves B1 and B2 are performance curves obtained when the two refrigerators are operated while helium gas is supplied from a single compressor with the conventional operation method. Curves C1 and C2 are performance curves obtained when the two refrigerators are operated while helium gas is supplied from a single compressor with the operation method of the present invention. Here, temperatures at the first and the second refrigerating stages when no load is imposed are respectively referred to as a first stage low-temperature-part temperature, and a second stage low-temperature-part temperature. Temperatures at the first and the second refrigerating stages when a load is imposed by heating the first and second stages with a heater are respectively referred to as a first stage high-temperature-part temperature, and a second stage high-temperature-part temperature.

Suppose the case where the two refrigerators each presenting the performances indicated by the solid curves A1 and A2 in FIG. 3 are operated with the single compressor at the same frequency (1.2 Hz here) as in the conventional refrigerating apparatus. In this case, as the chart clearly shows, the gas is sufficiently supplied for the refrigerator indicated by the broken line B1, thereby presenting the first stage low-temperature-part temperature of Tb11, and the second stage low-temperature-part temperature of Tb12, which are lower than those in the independent operation of the refrigerator (A1), namely presenting a higher performance. However, since the gas is not sufficiently supplied for the other refrigerator indicated by the broken line B2, the second stage high-temperature-part temperature of Tb22 increases in particular when the load is imposed on both the first and the second stages. On the other hand, with the present invention, when the one refrigerator is operated at 1.2 Hz, and the other one is operated at 1.198 Hz, which is less than 1.2 Hz by 0.002 Hz, as dash dots C1 and C2 show, both of the refrigerators present performances close to those presented in the independent operations with the respective refrigerators (A1 and A2).

The following details a second embodiment of the present invention where a refrigerating apparatus is applied to cryopumps.

Figure 4:
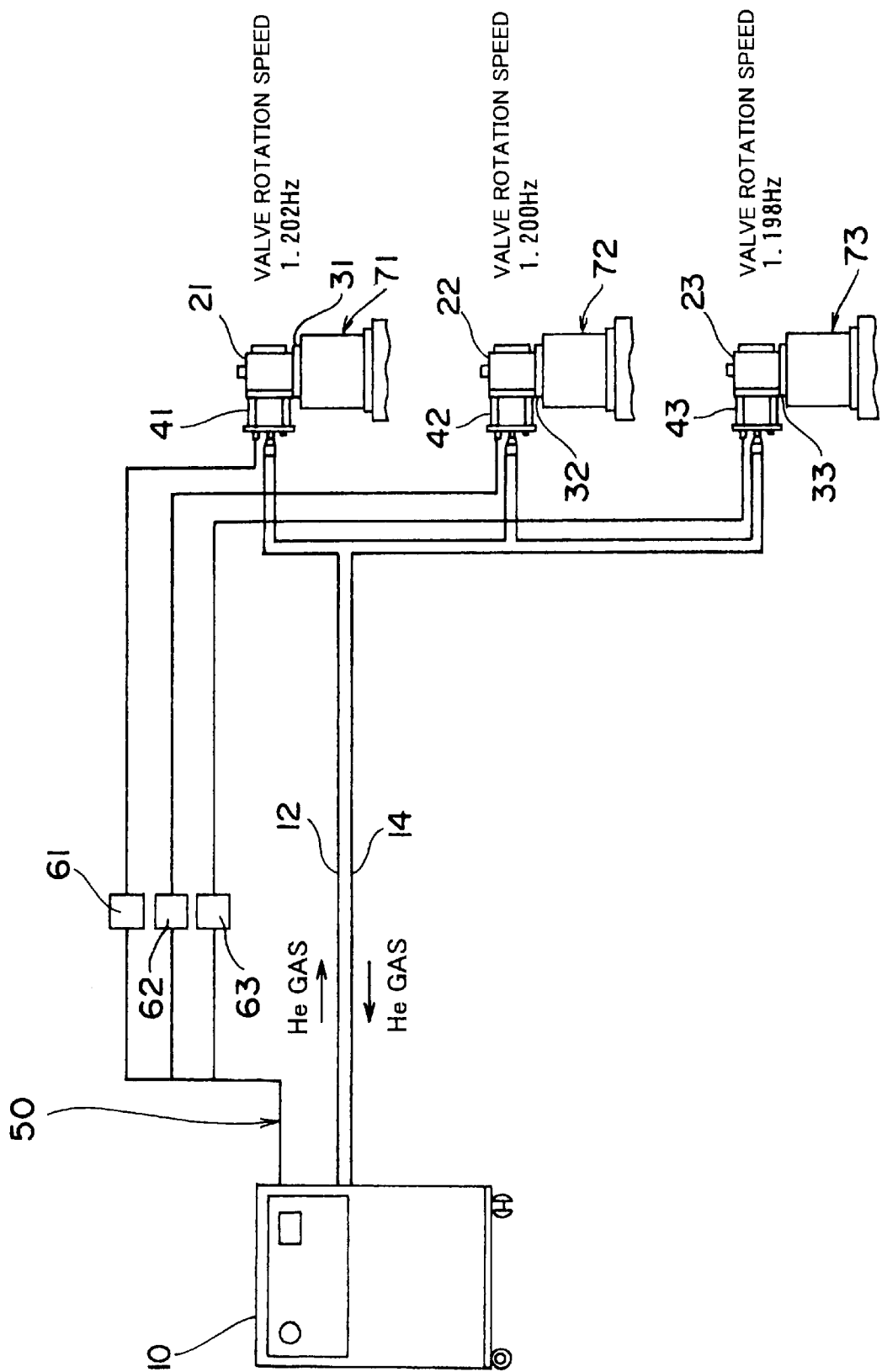
FIG. 4 is a piping diagram showing a second embodiment of the present invention.

The refrigerators 31, 32, and 33 of the first embodiment are used to refrigerate cryopumps 71, 72, and 73 as shown in FIG. 4 in the present embodiment.

Figure 5:
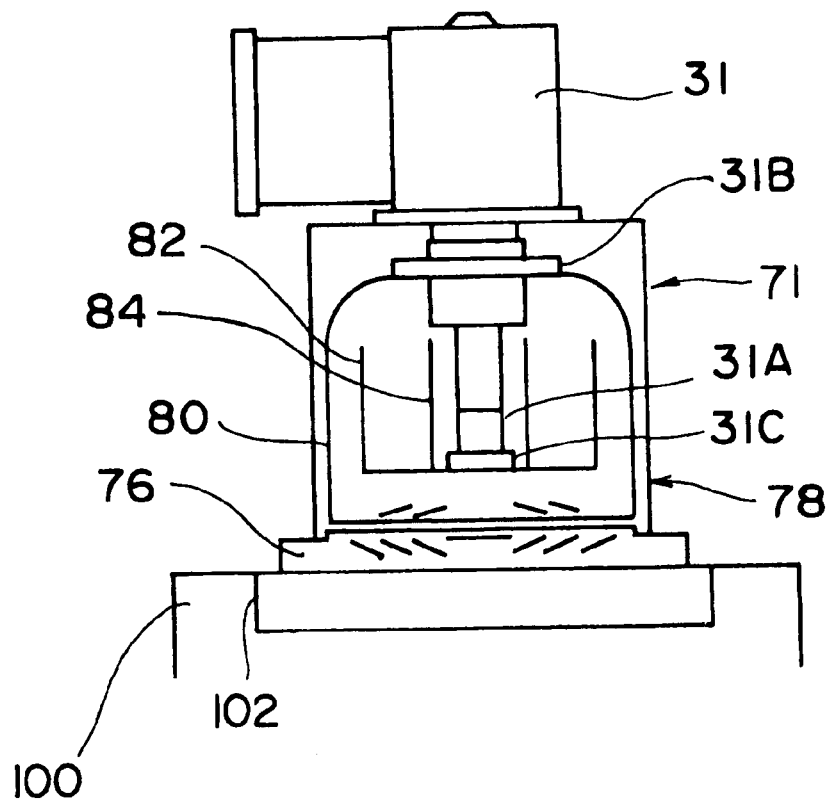
FIG. 5 is a magnified sectional view showing a structure of principal parts of a cryopump according to the second embodiment.

The cryopump 71, as an example of the individual cryopumps 71, 72, and 73, is mounted on a processing chamber 100 as shown in FIG. 5 in detail. The cryopump 71 includes a louver 76 communicating with the inner space of the processing chamber 100 through an opening provided with a gate valve 102, a pump container 78 including a relief valve, and the refrigerator 31 such as a GM refrigerator.

The refrigerator 31 is airtightly installed in the pump container 78. The cylinder 31A, a radiation shield 80, a condensation panel 82, and an absorption panel 84 are provided in the pump container 78. The cylinder 31A includes the first refrigerating stage 31B for refrigerating to 30 to 100 K, and the second refrigerating stage 31C for refrigerating to 4 to 20 K, for example. The radiation shield 80 is provided in contact with the first refrigerating stage 31B, and surrounds the second refrigerating stage 31C so as to reduce the radiation heat from the outside of the pump container 78 at the room temperature to the second refrigerating stage 31C. The condensation panel 82 and the absorption panel 84 are attached to the second refrigerating stage 31C, and condense and absorb gas for vacuum exhaustion.

The condensation panel 82 and the absorption panel 84 are refrigerated to 20 K or less. The louver 76 and the radiation shield 80 are refrigerated to 100 K or less.

The condensation panel 82 and the absorption panel 84 provided on the second refrigerating stage 31C of the cylinder 31A are refrigerated to condensate and absorb the gas in the pump container 78, thereby vacuum-exhausting the gas.

The other points in the present embodiment are the same as those in the first embodiment, and the description therefor will be omitted.

With the present embodiment, as in the first embodiment, since the shifted state in the valve timing among the refrigerators circulates in a certain period, the imbalance in the gas flow quantity through the individual refrigerators occurs evenly, thereby balancing the refrigerating performances of the individual refrigerators. As a result, the imbalance in the performance among the cryopumps can be prevented.

In the embodiments described above, since the inverters 61, 62, and 63 are used to change the frequencies, an increase in the number of the refrigerators can be handled easily. Also, when inverters are installed on a refrigerating apparatus for a different purpose, simply changing the setting of the inverters can provide the effect of the present embodiments, resulting in a very low cost. When it is not necessary to change the valve rotation speeds, it is possible to set fixed frequencies slightly shifted to one another without inverters. In addition, the type of the valves is not limited to the rotary valve.

Also, the number of the refrigerators operated simultaneously is not limited to three. When the sum of the shift amounts is within 0.02 Hz, the frequencies of the individual refrigerators are shifted by 0.002 Hz to one another, thereby balancing the performance of up to eleven (=10+1) refrigerators.

Further, the application of the present invention is not limited to a sputtering apparatus using cryopumps, and can be applied to an MRI apparatus and a radio telescope.

What is claimed is:

1. An operation method for multi-system refrigerators comprising supplying a plurality of refrigerators with gas compressed by one or more compressors through valves provided for the individual refrigerators, wherein opening/closing frequencies of the individual valves are slightly shifted to one another.

2. The operation method for multi-system refrigerators according to claim 1, wherein a shift amount of the opening/closing frequencies of the valves is changed depending on the number of the refrigerators.

3. The operation method for multi-system refrigerators according to claim 2, wherein a shift amount of the opening/closing frequencies of the valves is decreased as the number of the refrigerators increases.

4. The operation method for multi-system refrigerators according to claim 1, wherein a sum of shift amounts is 0.04 Hz or less, and mutual shift amounts among the individual refrigerators are about 0.002 Hz to 0.001 Hz.

5. An operation apparatus for multi-system refrigerators for supplying a plurality of refrigerators with gas compressed by one or more compressors through valves provided for the individual refrigerators, the operation apparatus comprising inverters configured to slightly shift an opening/closing frequency of each of the valves to one another.

6. A refrigerating apparatus comprising the operation apparatus according to claim 5.

7. The refrigerating apparatus according to claim 6, wherein said refrigerators are used as cryopumps.

* * * * *